United States Patent [19]

Reed

[11] Patent Number: 4,785,196
[45] Date of Patent: Nov. 15, 1988

[54] METHOD AND APPARATUS FOR CONVERTING SEISMIC TRACES TO SYNTHETIC WELL LOGS

[75] Inventor: John T. Reed, Ponca City, Okla.
[73] Assignee: Conoco Inc., Ponca City, Okla.
[21] Appl. No.: 473,128
[22] Filed: Mar. 7, 1983
[51] Int. Cl.$^4$ .............................................. G01V 1/00
[52] U.S. Cl. ......................................... 367/73; 367/43
[58] Field of Search ...................... 367/45, 46, 47, 73, 367/405, 43; 364/421; 343/17.2 PC, 378

[56] References Cited

U.S. PATENT DOCUMENTS

| | | | |
|---|---|---|---|
| 3,076,176 | 1/1963 | Lawrence | 367/46 |
| 3,292,144 | 12/1969 | Lee et al. | 367/73 |
| 3,312,933 | 4/1967 | Lawrence et al. | 367/46 |
| 3,335,401 | 8/1967 | Kerns | 340/7 |
| 3,517,173 | 6/1970 | Gilmartin, Jr. et al. | 235/156 |
| 3,555,503 | 1/1971 | Morris | 340/17 |
| 3,598,982 | 8/1971 | Lawrence | 367/46 |
| 3,680,040 | 7/1972 | Silverman et al. | 340/15.5 |
| 3,731,268 | 5/1973 | Landrum, Jr. | 340/15.5 |
| 3,968,471 | 7/1976 | Savit | 364/421 |
| 4,031,505 | 6/1977 | Owens | 340/15.5 |
| 4,173,749 | 11/1979 | Corkhill | 367/190 |
| 4,204,278 | 5/1980 | Nelson | 367/39 |
| 4,223,399 | 9/1980 | Hackett | 367/41 |
| 4,253,164 | 2/1981 | Hall, Jr. | 367/22 |
| 4,295,213 | 10/1981 | Mifsud | 367/41 |

OTHER PUBLICATIONS

Rice, R. B., "Inverse Convolution Filters," Geophysics, vol. 27, #1, 2/62, pp. 4–18.
R. E. White, "Partial Coherence Matching of Synthetic Seismograms with Seismic Traces," Geophysical Prospecting, vol. 28, pp. 333–358, 1980.
Ackroyd et al., "Optimum Mismatched Filters for Sidelobe Suppression," IEE Transactions on Aerospace and Electronics Systems, vol. AES-9, #2, 3/73.

Primary Examiner—Thomas H. Tarcza
Assistant Examiner—Ian J. Lobo
Attorney, Agent, or Firm—Ronald J. Carlson; Cortlan R. Schupbach; Frank J. Kowalski

[57] ABSTRACT

Method and apparatus for producing improved synthetic velocity logs from seismic traces. The seismic traces are processed to enhance high frequency content by converting each trace to a spike trace, then filtering the spike trace with a function designed to reduce side lobes and enhance high frequency content. The processed trace is then operated on by a conventional summation process to produce a synthetic velocity log. Due to the enhanced high frequency content of the processed trace, the resulting synthetic log tends to show sharp discontinuities in the geology, much like a log taken from a well.

9 Claims, 6 Drawing Sheets fig. 1.

METHOD AND APPARATUS FOR CONVERTING SEISMIC TRACES TO SYNTHETIC WELL LOGS

This invention relates to seismic prospecting and more particularly to an improved method and apparatus for producing synthetic velocity logs.

Well logs, that is records produced by lowering a logging tool into a well and recording the characteristics of the earth layer near the tool, have long been used as interpretive aids in exploration geophysics. Velocity logs, or impedance logs as they are sometimes known, are an aid in delineating the geology in the vicinity of the well, since they tend to identify sharp discontinuities between beds of different geologic structure.

Much of exploration geophysics is based on the seismic process, and the utility of manipulating seismic data to create synthetic velocity logs has been appreciated. Much as an actual well log, it is desired to use the synthetic log as an aid in delineating the geology traversed by the seismic energy. However, due to the limitations of the seismic process, synthetic logs produced from seismic data heretofore have not been as useful as well logs in identifying rapid velocity changes or in delineating sharp discontinuities between subsurface bedding planes.

In view of the foregoing, it is a general aim of the present invention to produce a new type of synthetic velocity log having an appearance much more like a true well log than prior synthetic logs.

In accomplishing that aim, it is an object of the present invention to enhance the information content of seismic traces, then use those enhanced traces to produce a synthetic velocity log better able to delineate subsurface geology.

Other objects and advantages will become apparent from the following detailed description when taken in conjunction with the drawings in which.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
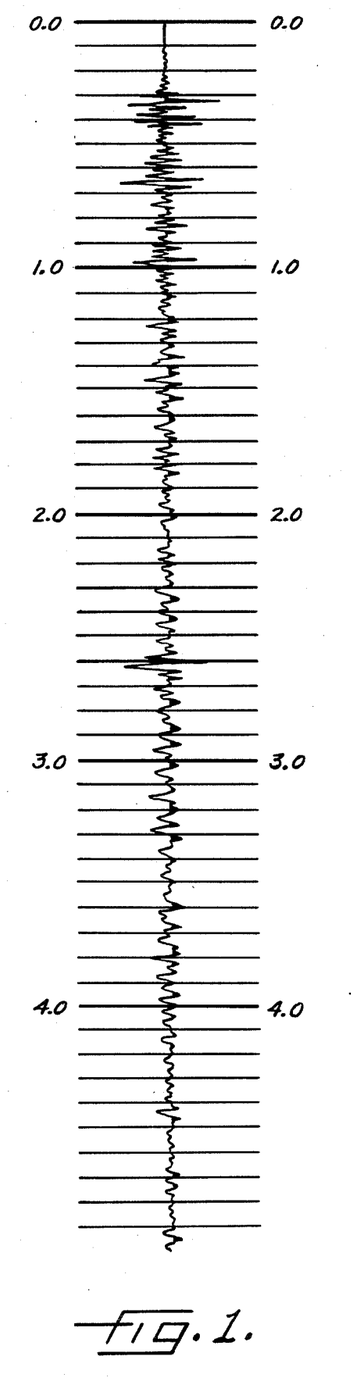
FIG. 1 illustrates a portion of a conventional seismic trace suitable for processing in accordance with the present invention.

Turning now to the drawings, FIG. 1 illustrates a conventional seismic trace in wiggle trace format showing energy reflected from the subsurface in the seismic process. Due to the nature of the seismic process including the characteristics of the seismic source and the filtering of the seismic energy accomplished by the earth, the trace is rather severly band limited at both the low and high frequency ends of the spectrum. FIG. 1 also illustrates that the high frequency attenuation becomes more severe with increasing record time.

By way of contrast, sonic logs taken in well bores retain a good deal of high frequency information content. Thus, as the logging tool traverses from one bedding plane to another, the log has sufficient frequency content to indicate the discontinuity between beds. As a result, sonic logs are useful along with other displays such as stacked lines in making geologic interpretations.

When a trace such as illustrated in FIG. 1 is used to produce a synthetic velocity log, the resulting log has a bandwidth determined by the bandwidth of the input data which as noted above is rather restricted. Thus, synthetic velocity logs tend to be less useful in delineating sharp discontinuities between subsurface bedding planes because of the limited bandwidth available.

Figure 2:
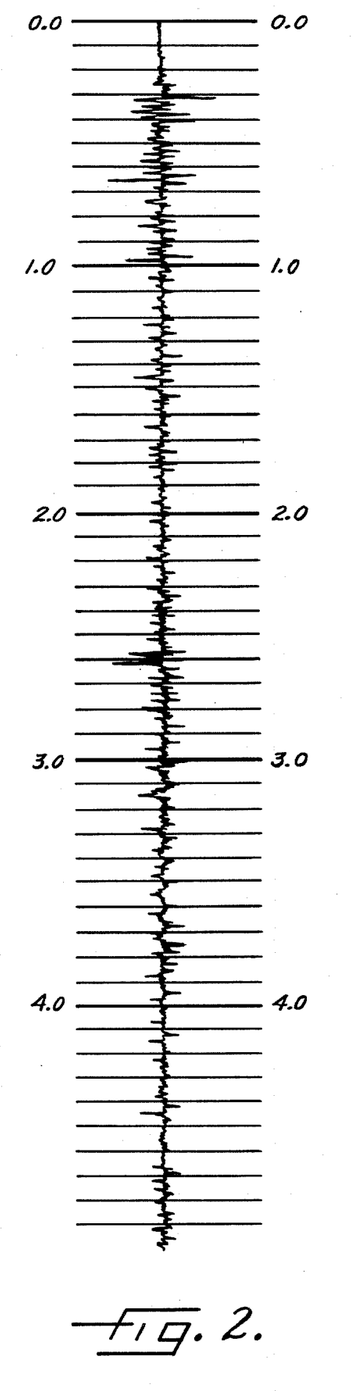
FIG. 2 illustrates the seismic trace of FIG. 1 after processing in accordance with the present invention.
Figure 3:
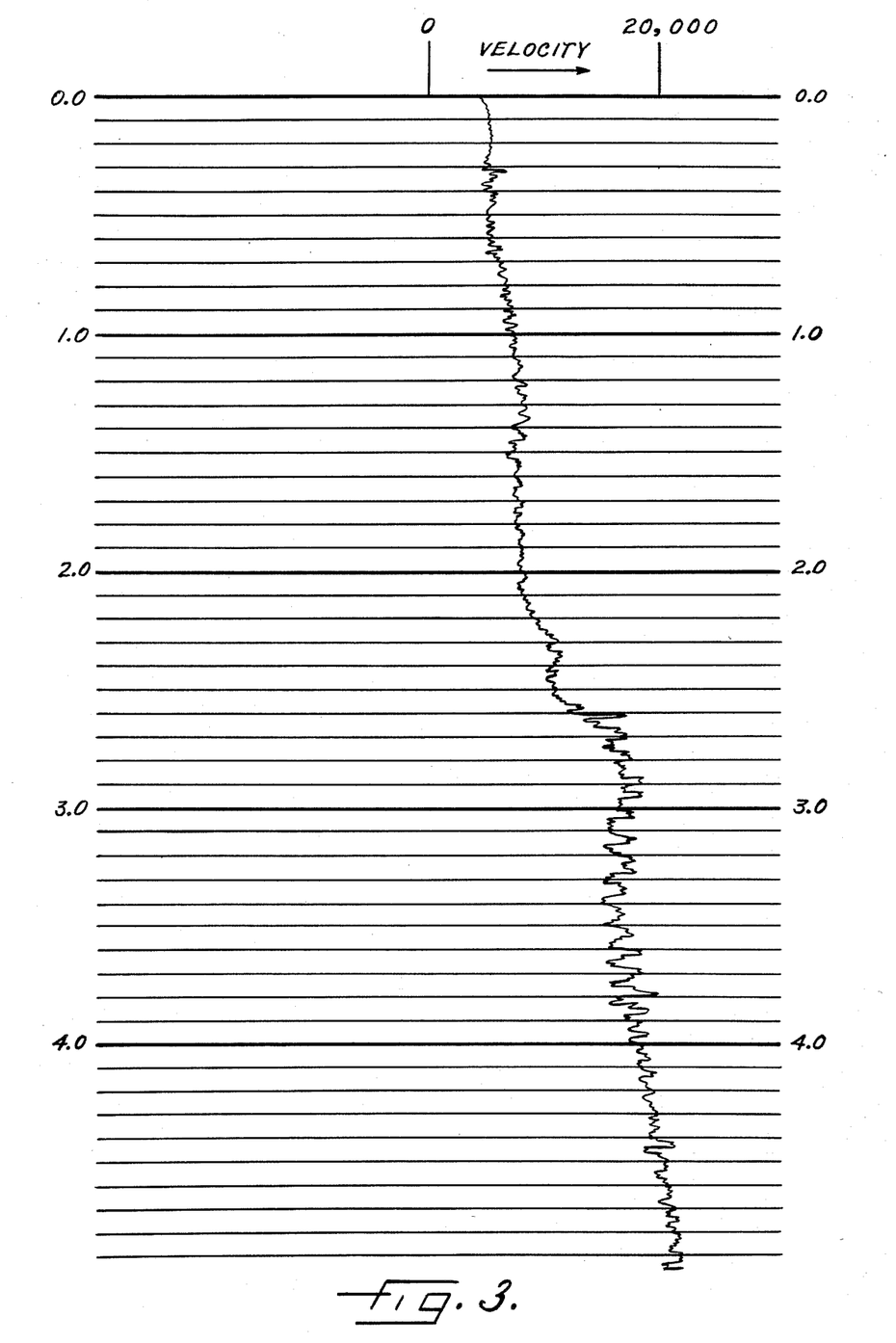
FIG. 3 illustrates a synthetic velocity log produced from the processed trace of FIG. 2.

In accordance with the invention, a seismic trace such as illustrated in FIG. 1 is processed to enhance the high frequency content before converting the trace to a synthetic velocity log. Thus, the resulting log has a greater bandwidth than the original data and is better able to identify discontinuities between beds in the subsurface. An enhanced seismic trace produced in accordance with the present invention is illustrated in FIG. 2, and clearly shows the resulting increased bandwidth. A synthetic velocity log produced from the enhanced trace of FIG. 2 is illustrated in FIG. 3. It will be apparent to those skilled in this art that the synthetic log of FIG. 3 has a greater bandwidth and looks much more like a record produced from logging a well than conventional synthetic logs. Thus, the geologist is better able to relate the log to actual rock velocities in the subsurface, and can use the sharp changes in velocity which it shows along with other interpretational aids in assessing the nature of the subsurface.

Figure 4:
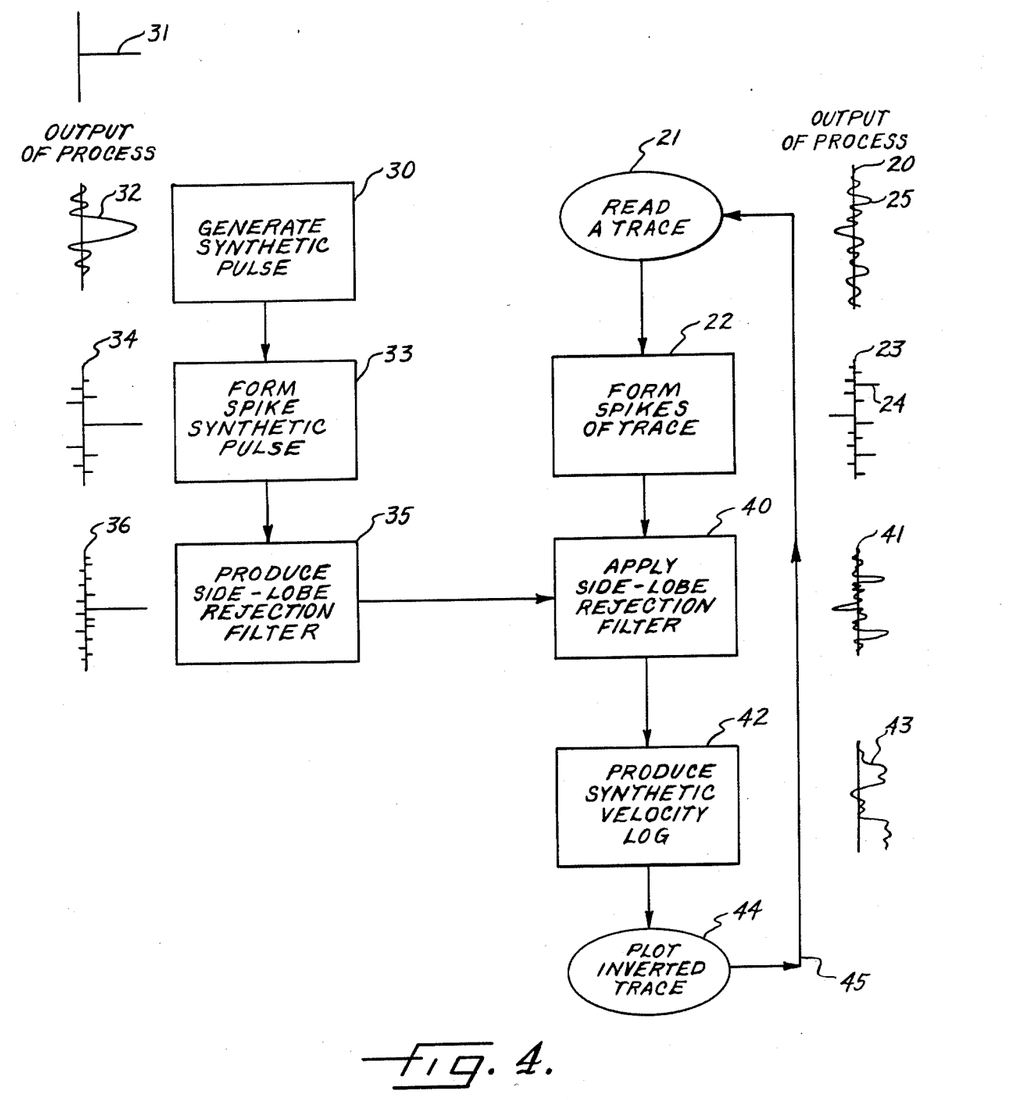
FIG. 4 is a simpled flow diagram (showing seismic trace shapes) and illustrating the present invention.

Before turning to FIG. 4 for a description of the process, attention will first be directed to the nature of the input trace as shown in FIG. 1. FIG. 1 does not represent a raw seismic trace, but preferably is a trace which has been processed to bring the phase of all reflections as near to zero as possible, and to enhance signal to noise ratio. The phase correction is accomplished by conventional processes, some of which depend on the nature of the seismic data. For example, deconvolution can be used, or the trace can be cross correlated with the signature of the seismic source in appropriate cases. Bringing the phase of all reflections as near to zero as possible supports the assumption that every peak and trough of the processed trace represents a seismic reflection. Signal to noise ratio is enhanced by performing an NMO correction on the preprocessed data and stacking one or a few adjacent common depth point gathers (CDP's).

FIG. 4 illustrates a portion of a preprocessed input trace at 20 associated with a process step 21 adapted to read such a trace into the system. Because the trace 20 has the phase of all reflections as near to zero as possible it can be assumed that each peak and trough represents a seismic reflection. In accordance with the invention, a step 22 is performed which converts the trace 20 to a spike trace 23 having spikes denoting the amplitudes of peaks and troughs, and zero values elsewhere. Thus, the individual spike 24 represents the amplitude of the peak 25, and similarly the other spikes represent the amplitudes of the associated peaks or troughs.

It will now be apparent that the step 22 has enhanced the high frequency content of the seismic record by replacing the slowly undulating wavelets with sharp spikes. However, the spike trace 23 retains a measure of low frequency distortion in that it includes "extra" reflectors caused by side lobes of true reflections which are picked as events. In further practicing the invention, the spike trace 23 is filtered with a function adapted to minimize the side lobes and associate the energy due to a given reflector with the main lobe of the event. Furthermore, the frequency content of the filter operator is established in such a way as to preserve the bandwidth of the processed trace within desired limits which are typically greater than the bandwidth of the original signal.

Generation of such a filter function is illustrated at the left of FIG. 4. A process step 30 is used to generate a synthetic pulse within an operator specified frequency range. Typical parameters can be a low frequency cutoff of 8 Hz and a high frequency cutoff of 40 Hz; however, it is emphasized that the frequency range is selectable and can be chosen to suit the requirements of a particular set of seismograms and of the overall process. The synthetic pulse is generated in the step 30 by establishing a spectrum which has magnitude 1 and phase zero in the data bandwidth and magnitude zero elsewhere, as illustrated by synthetic spike 31. The step 30 is then used to take the inverse Fourier transform of the input spectrum of pulse 31 within the specified frequency range to produce a synthetic pulse 32 having a main lobe and side lobes, the shape and amplitude of which depend on the specified frequency range. Because it was produced from the spike 31, the synthetic pulse 32 has a flat power spectrum and zero phase over the specified bandwidth A step 33, similar to the step 22, is then used to form a spike synthetic pulse 34 having spikes denoting the amplitudes of the peaks and troughs of the synthetic pulse 32. A step 35 operates on the spike synthetic pulse 34 to produce a side lobe rejection filter 30 using Wiener least squares theory as described, for example in "Extrapolation, Interpolation and Smoothing of Stationary Time Series" by Norbert Wiener published by J. Wiley and MIT in 1949 and 1964. In the step 35 a set of filter coefficients exemplified by the filter function 36 are produced which, when convolved with the spike synthetic pulse 34 produce an output trace approximating the original synthetic spike 31. Thus, when the filter 36 is convolved with the spike synthetic pulse 34, an output will be produced which has side lobe amplitudes reduced to as small a value as possible consistent with the least squares assumptions of the Wiener process.

In accordance with the invention, that filter 36 is then convolved with the spike trace 23 to reduce side lobes while maintaining the desired frequency content to produce an output trace 40 in which the peaks and troughs represent true reflections. The enhanced trace 41 is then applied to a conventional process 42 to produce a synthetic velocity log 43, but one which has an enhanced frequency content and is therefore more useful in interpreting the geologic structure through which the seismic energy passed. The log is plotted by the process step 44, and the loop 45 suggests that the same filter function 36 can be applied to a plurality of traces along the seismic line in question. The velocity logs which can be produced along the line will take the form generally illustrated in FIG. 3 which contain components of higher frequency than has heretofore been achievable in synthetic logs, which appear much more like a conventional well log, and which aid the geologist in interpreting the subsurface structure along the line.

Attention will now be directed to FIGS. 5a–5e for the purpose of providing additional detail on the process more generally illustrated in FIG. 4. A first step 50 allows for the entry of parameters which can be selected by the operator including the low frequency cutoff $f_L$ and the high frequency cutoff $f_H$ which establish the bandwidth desired for the enhanced trace 41 of FIG. 4. In addition, a random noise factor $R_n$ can be selected to compensate the filter function for the noise characteristics of the particular data being processed. The length of the synthetic pulse $L_P$ is also specified, and that determines the length of the side lobe rejection filter. Finally, the sample data rate $D_t$ is an input parameter which relates to the sampling interval of the trace being processed.

Figure 5A:
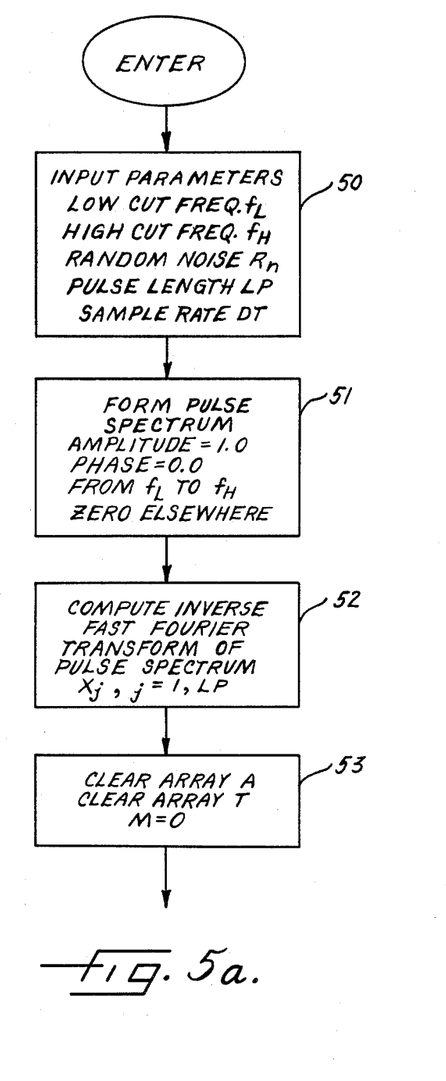
FIGS. 5a-e is a more detailed flow diagram.

The process illustrated in FIG. 5a first produces the side lobe rejection filter. The steps 51, 52 correspond to the step 30 of FIG. 4 which results in the production of the synthetic pulse 32. As can be seen, the step 51 forms a pulse spectrum having amplitude 1 and phase zero for the bandwidth in question ($f_L$ to $f_H$) and zero elsewhere. As noted above, that operation is accomplished in the frequency domain and the step 52, the inverse fast Fourier transform, converts the synthetic pulse back to the time domain. A step 53 clears arrays A and T and sets an index M to zero in preparation for forming the spike synthetic pulse.

The element 54 sets limits j for a looping operation between 2 and 1 less than the numbers of samples in the synthetic pulse, while the step 55 compares adjacent samples to define the peaks and troughs. The first expression within step 55 establishes the derivative of the synthetic pulse immediately behind the $X_j$ sample point and the second expression establishes the derivative immediately ahead of that sample point. If the points in, question are all on a ascending or descending section of the synthetic pulse, both factors will be either positive or negative, and the product resulting from the third expression will be positive. However, at peaks or troughs where the curve changes direction, the product resulting from the third expression will be negative, because the derivatives will be of a different sign. Accordingly, the test 56, if it finds a positive value for DXP, increments the index j and compares the next set of points. However, when the product is negative, a peak or trough has been reached, and the test 56 branches to a step 57 which increments the index M, then at a step 58 stores the amplitude and time for the point in question. In order to obtain the maximum represented by the three data points in question, the step 58 computes a parabolic fit to the three points by way of interpolating to the maximum in the data, then stores the amplitude. $A_M$ and the associated record $T_M$ in an appropriate array. Processing returns to the step 54 until all of the points on the synthetic pulse have been processed and it has been converted to a spike synthetic pulse 34 (FIG. 4).

Figure 5B:
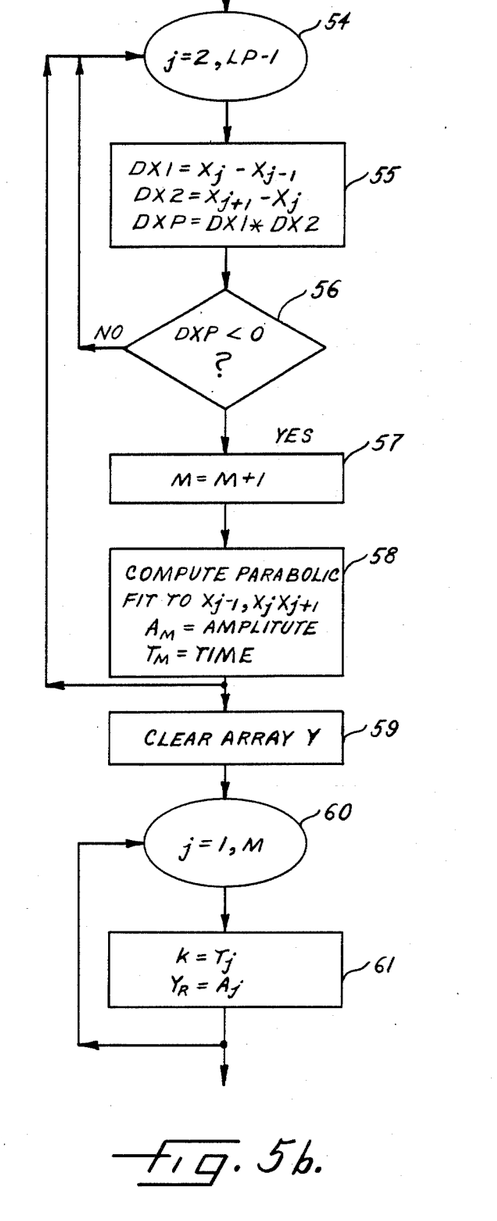
Figure 5C:
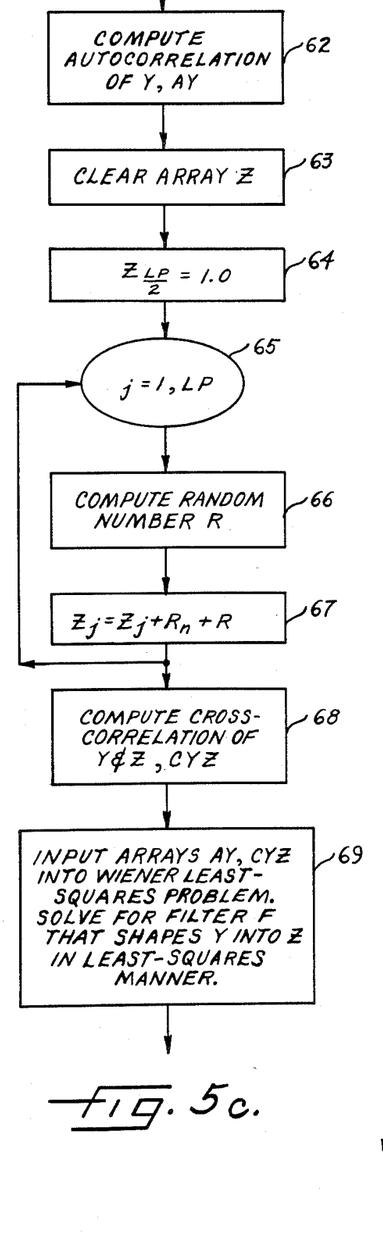

Having converted the synthetic pulse to a spike synthetic pulse, the process then arranges the results in an array which can be manipulated according to the Wiener least squares criteria to produce the side lobe rejection filter. A step 59 clears an array Y, and a step 60 sets limits for an index j between 1 and M, the number of peaks and troughs found. A step 61 creates an array where k represents the record time associated with the peaks and troughs and $Y_k$ represents the amplitudes of those peaks and troughs. A step 62 then operates on that information to compute the autocorrelation AY of the array Y. While the step 62 defines information related to the filter input, the steps beginning at 63 define the desired output, thus representing the two items of information necessary for determining the coefficients of the Wiener least squares filter. Step 63 clears an array Z while the step 64 establishes an amplitude of 1 at the midpoint of the array, thus representing a desired output of amplitude 1 at zero phase and zeros elsewhere within the bandwidth in question. The loop beginning at step 65 modifies the desired output in accordance with the noise figures initially input as well as random or white noise included to stabilize the matrix inversion process. For each filter sample defined by the length of the synthetic pulse L$_P$, a step 66 computes a random number R which is white noise, multiplied in a step 67 by the input noise factor and added to the numbers existing in the array Z, i.e., 1 at the midpoint and zeroes elsewhere. A step 68 then determines the cross correlation of the input array Y (the peak and trough spike array created by step 61) and the desired output array Z determined by step 67. The cross correlation array CYZ along with the autocorrelation array AY are provided to a step 69 which determines the filter coefficients based on that information. While Wiener least squares theory is familiar to those working in this art, briefly the step 69 takes the Z transform of the input information (the array AY) and the desired output information (the array CYZ), then divides the Z transform of the desired output array (CYZ) by the Z transform of the input array (AY). The inverse Z transform of that quotient then yields the filter factors which transform the spike synthetic pulse 34 to an approximation of the original spike 31 consistent with the assumptions of the Wiener process. Smoothing is accomplished in a step 70 which applies cosine tapers to the ends of the filter F.

Figure 5D:
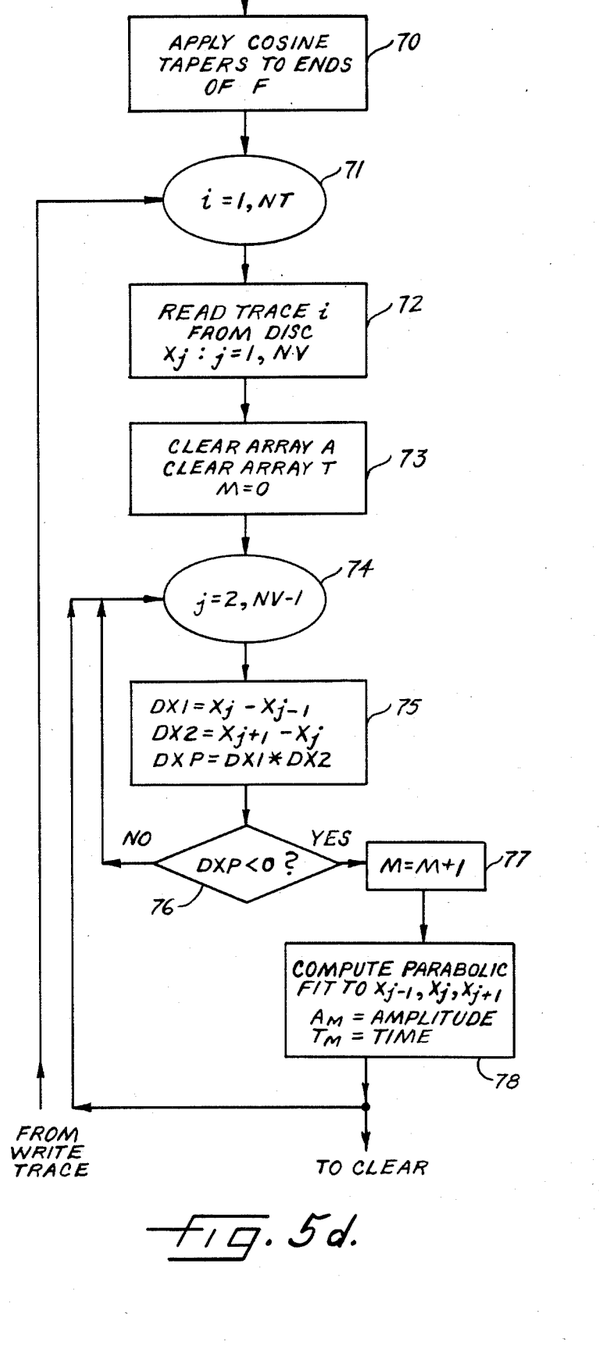
Figure 5E:
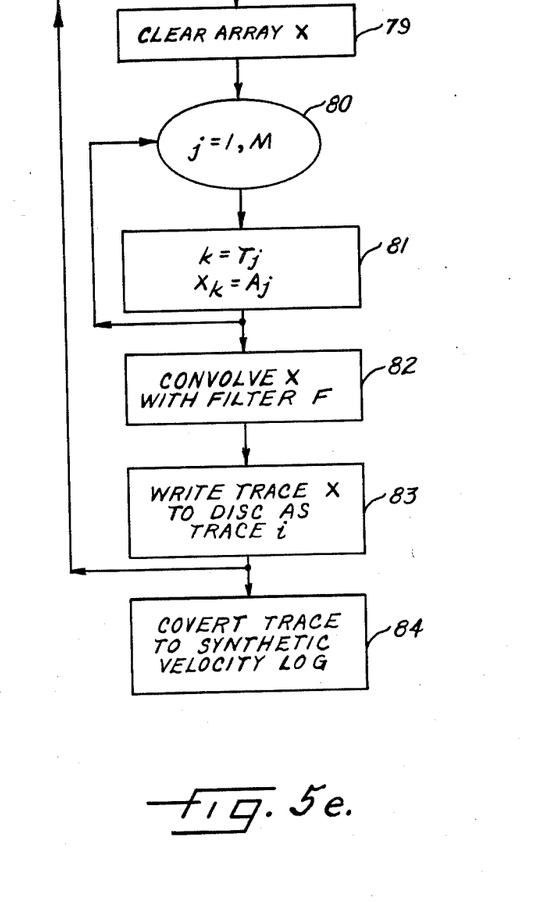

Having determined the coefficients of the side lobe rejection filter for the frequency range initially specified, the preprocessed input traces are input one at a time and processed as illustrated beginning at step 71, which simply specifies the number of input traces to be processed in sequence. The step 72 reads the first trace from the disk while the step 73 clears an amplitude array A, a time array T and sets an index M to zero. As described in connection with steps 54–61, the process steps 74–81 determine the peaks and troughs in the trace being processed, then establish an array X which indicates the record time and amplitude associated with each peak and trough, thereby to create the spike trace 23 of FIG. 4. In practicing the invention, the spike trace is then convolved with the filter F created by step 69 in a convolution step 82. As a result, the step 82 produces the output trace 41 (FIG. 4) with enhanced high frequency content and side lobe minimization. That enhanced trace can be written to disk by a step 83 where it can be recalled by a step 84 for conversion to a synthetic velocity log, or can be converted before being written to disk. As is well known, the process of creating a synthetic velocity log is a simple integration process where the velocity at any point $v_{i+1}$ is determined by the summation of the magnitudes of the reflection coefficients preceding that point, or, in other words:

$$v_{i+1} = \sum_{j=1}^{i} r_j$$

If it is desired to add low frequency components to the final synthetic velocity log, these may be included by using the following expression:

$$V_{i+1} = V_{i+1} \exp\left(2 \sum_{j=1}^{i} r_j\right)$$

where the array V represents the low frequency components of the seismic velocity. V can be determined from analysis of the stacking velocity or estimated from nearby sonic well logs. The synthetic log of FIG. 3 represents the condition with low frequency components added.

It will now be apparent that in practicing the present invention it is possible to create a synthetic velocity log having a frequency content much like that of a true velocity log, providing a geophysicist a much more familiar tool to aid his interpretation. The method is performed by the process steps described in detail above; with respect to the apparatus of system aspects of the invention, based on the foregoing disclosure it will now be within the ability of those skilled in this art to suitably program a digital computer which will then comprise means for performing the functions described in detail above.

I claim as my invention:

1. A method of producing an improved synthetic velocity log comprising the steps of producing a filter function which converts a synthetic pulse of predetermined bandwidth to an approximation of a spike function, producing a seismic trace, converting the seismic trace to a spike trace having spikes denoting the amplitudes of peaks and troughs, convolving the spike trace with the filter function to produce an output trace with enhanced high frequency content, and producing a synthetic velocity log from the output trace.

2. The method as set out in claim 1 further including sequentially producing a plurality of seismic traces and performing the steps of converting, convolving and producing a synthetic velocity log on each of said traces.

3. The method as set out in claim 1 wherein the step of producing a filter function includes specifying said predetermined bandwidth.

4. The method as set out in claim 1 wherein the step of producing a filter function includes employing a Wiener least squares process.

5. A method of producing an improved well log comprising the steps of producing a synthetic spike, transforming the synthetic spike to a synthetic pulse having a flat power spectrum and zero phase over a predetermined bandwidth, converting the synthetic pulse to a spike synthetic pulse having spikes defining the amplitude of peaks and troughs in the synthetic pulse, producing a filter to transform the spike synthetic pulse to an approximation of a single spike, producing a seismic trace, converting the seismic trace to a spike trace with spikes denoting the amplitude of peaks and troughs in the seismic trace, filtering the spike trace with the filter to produce an output trace, and producing a synthetic velocity log from the output trace.

6. A system for converting seismic traces to synthetic well logs comprising in combination, means for producing a synthetic pulse having a flat power spectrum and zero phase within a predetermined bandwidth, means for producing a filter from the synthetic pulse to produce an output approximating a single spike, means for converting a seismic trace to a spike trace having spikes denoting the amplitudes of peaks and troughs in the seismic trace, means for convolving the spike trace with the filter to produce an output trace with enhanced high frequency content, and means for producing a synthetic velocity log from the output trace.

7. The system as set out in claim 6 further including means for sequentially producing a plurality of seismic traces for operation on by the converting means, the convolving means and the means for producing a synthetic velocity log.

8. The system as set out in claim 6 wherein the means for producing a synthetic pulse includes means for specifying said predetermined bandwidth.

9. The system as set out in claim 6 wherein the means for producing a filter includes means for producing said output approximating said single spike to a Wiener least squares approximation.

* * * * *